Figure 1A:
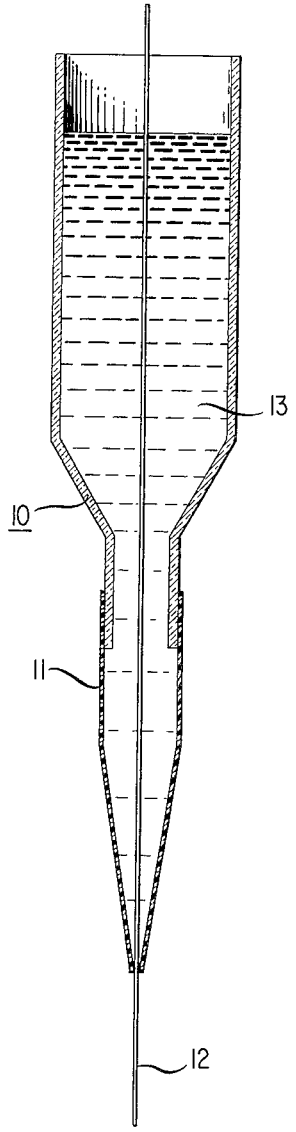
Figure 1B:
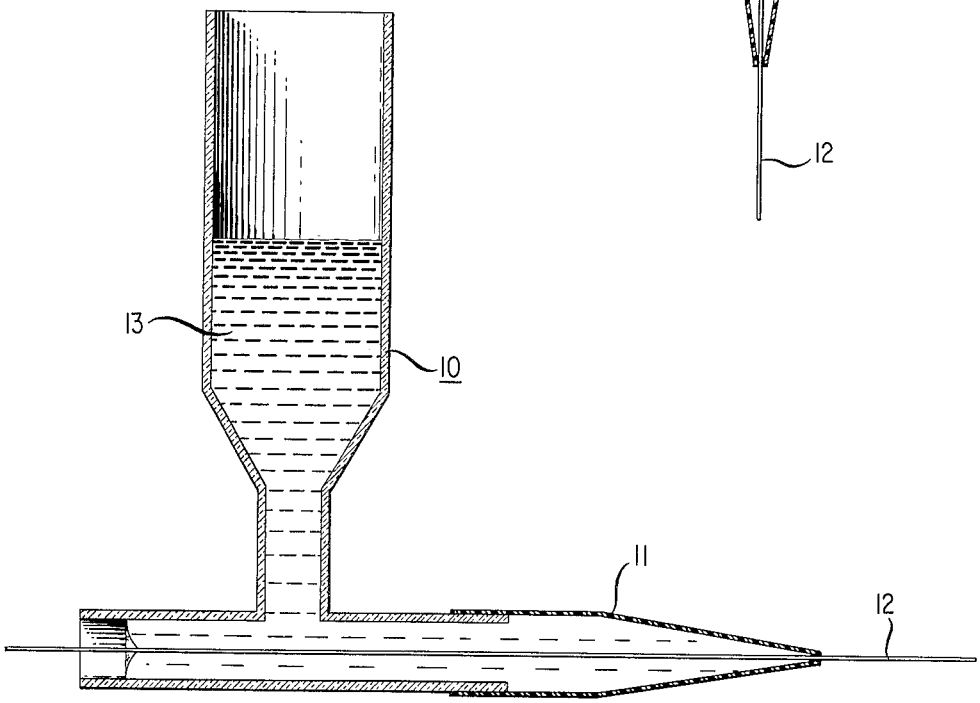
Figure 2A:
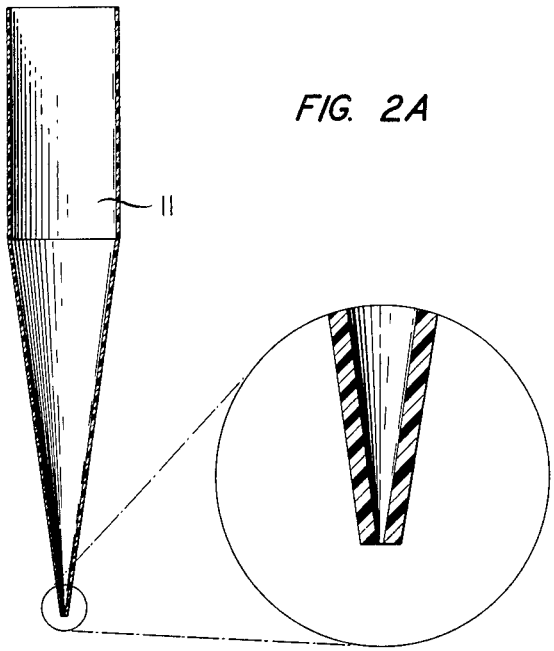
Figure 2B:
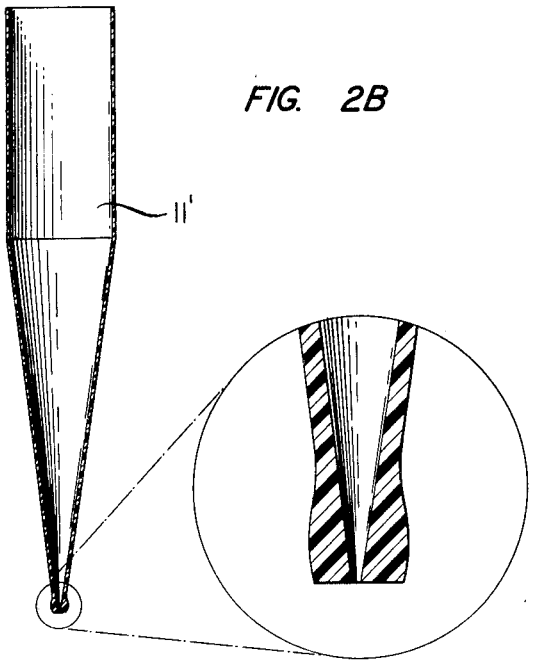
Figure 2C:
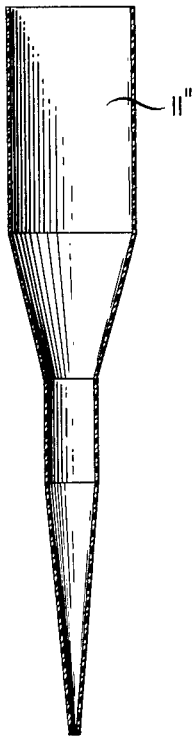

United States Defensive Publication [19] (H) [11] T963,002

Albarino et al. [43] Oct. 4, 1977

[54] COATING OF FIBER WAVEGUIDES

[75] Inventors: Robert Vincent Albarino, Summit; Arthur Clifford Hart, Jr., Chester, both of N.J.

[73] Assignee: Bell Telephone Laboratories, Incorporated, Murray Hill, N.J.

[21] Appl. No.: 701,302

[22] Filed: June 30, 1976

[51] Int. Cl.[2] ..... C03B 37/02

[52] U.S. Cl. ..... 65/3 R; 65/3 A; 65/11 R; 118/405; 427/163; 427/169; 427/434 E

[57] ABSTRACT

The specification describes coating techniques for glass fiber waveguides that avoid physical contact of the fiber by anything other than the coating solution. The techniques depend on the use of very flexible easily deformable materials for the exit die of flooded die applicators.

7 Claims, 2 Sheets Drawing,

2 Pages Specification

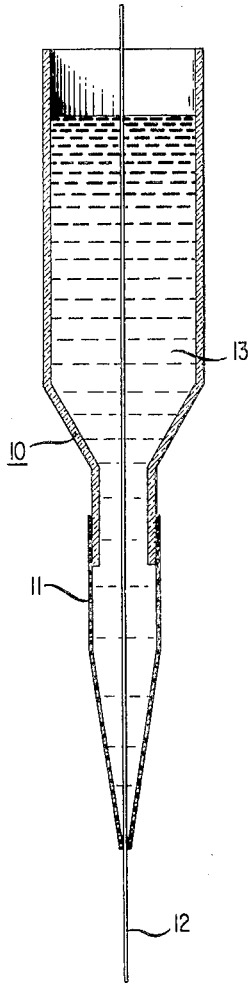

The file of this unexamined application may be inspected and copies thereof may be purchased (849 O.G. 1221, Apr. 9, 1968).